US 9,101,001 B2

(12) United States Patent
Wagner

(10) Patent No.: US 9,101,001 B2
(45) Date of Patent: Aug. 4, 2015

(54) SPECTRALLY-CONTROLLED BACKLIGHTING FOR LCD DISPLAYS

(71) Applicant: C-Marine Dynamics, Inc., Hampton, NH (US)

(72) Inventor: Charles J. Wagner, Stratham, NH (US)

(73) Assignee: C-Marine Dynamics, Inc., Hampton, NH (US)

( * ) Notice: Subject to any disclaimer, the term of this patent is extended or adjusted under 35 U.S.C. 154(b) by 0 days.

(21) Appl. No.: 14/212,318

(22) Filed: Mar. 14, 2014

(65) Prior Publication Data

US 2014/0265928 A1 Sep. 18, 2014

Related U.S. Application Data

(60) Provisional application No. 61/789,868, filed on Mar. 15, 2013.

(51) Int. Cl.
| | |
|---|---|
| *H05B 37/02* | (2006.01) |
| *G09G 3/34* | (2006.01) |
| *F21V 8/00* | (2006.01) |
| *G02F 1/1335* | (2006.01) |

(52) U.S. Cl.
CPC .............. *H05B 37/02* (2013.01); *G02B 6/0083* (2013.01); *G09G 3/3413* (2013.01); *G02B 6/009* (2013.01); *G02B 6/0073* (2013.01); *G02B 6/0085* (2013.01); *G02F 1/133615* (2013.01)

(58) Field of Classification Search
USPC .................. 315/291, 294, 297, 312; 362/612; 345/102
See application file for complete search history.

(56) References Cited

U.S. PATENT DOCUMENTS

| | | | | |
|---|---|---|---|---|
| 2001/0013854 A1* | 8/2001 | Ogoro | ........................... | 345/102 |
| 2006/0066266 A1* | 3/2006 | Li Lim et al. | ................. | 315/291 |
| 2007/0103934 A1* | 5/2007 | Keh et al. | ...................... | 362/612 |
| 2007/0279368 A1* | 12/2007 | Shefter | ......................... | 345/102 |
| 2008/0150879 A1* | 6/2008 | Kang | ............................ | 345/102 |
| 2010/0289755 A1* | 11/2010 | Zhu et al. | ...................... | 345/173 |
| 2011/0163691 A1* | 7/2011 | Dunn | ............................ | 315/297 |
| 2012/0188790 A1* | 7/2012 | Isobe | ............................ | 362/602 |
| 2014/0139499 A1* | 5/2014 | Hussain et al. | ............... | 345/204 |

OTHER PUBLICATIONS

Cypress Perform, Anshul Gulati, Multi Channel Color Mixing Using HB LEDs, AN 51188 (Jan. 20, 2011).
Radiant Zemax, How to Model an LCD Backlight, available at http://www.radiantzemax.com/kb-en/Knowledgebase/How-to-Model-an-LCD-Backlight (Feb. 21, 2008).
Sharp Microelectronics, Noel Giamello, LED Backlighting for LCDs: Options, Design Considerations, and Benefits (Mar. 2010).

* cited by examiner

*Primary Examiner* — Douglas W Owens
*Assistant Examiner* — Jonathan Cooper
(74) *Attorney, Agent, or Firm* — Mesmer & Deleault PLLC

(57) ABSTRACT

A display backlight assembly includes a light guide panel having first and second principal faces and at least one edge surface. A display screen is aligned with and substantially perpendicular to the first principal face of the light guide panel. The assembly also includes a light source with one or more white LEDs and one or more first color LEDs, where each first color LED emits a first color of light that is red, green, blue, or yellow. Each white LED and each first color LED is positioned to emit light into the light guide panel. A controller is electrically coupled to the light source and capable of independently setting an intensity value for each white LED and for each first color LED. The controller controls illumination of the LEDs independently as needed to provide backlighting with the selected intensity.

18 Claims, 7 Drawing Sheets

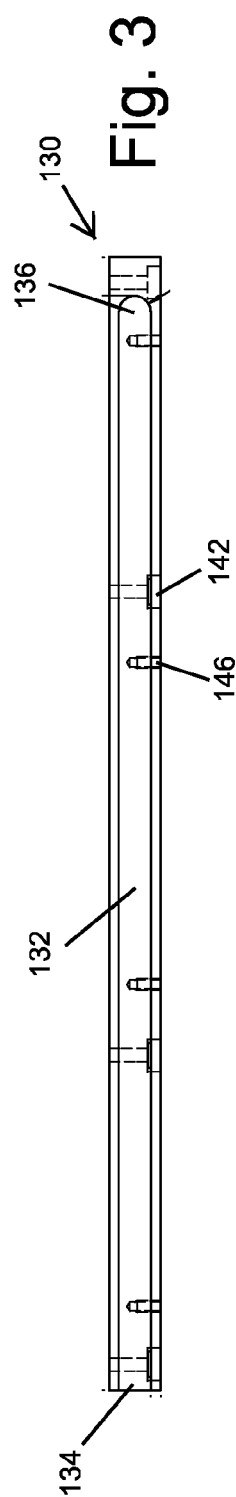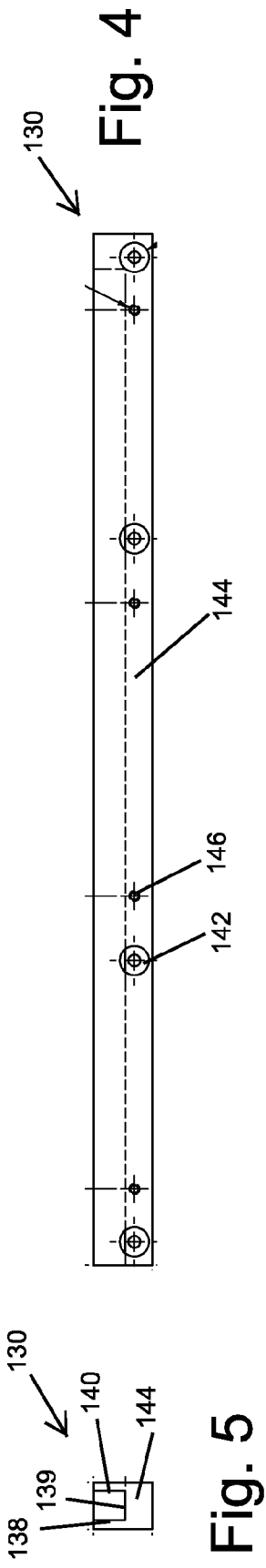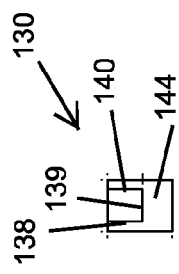

SPECTRALLY-CONTROLLED BACKLIGHTING FOR LCD DISPLAYS

BACKGROUND OF THE INVENTION

1. Field of the Invention

The present invention relates generally to electronic display equipment and more particularly to LED backlighting for LCD displays.

2. Description of the Prior Art

Liquid crystal displays (LCDs) use backlighting to affect the brightness, contrast, and other aspects of the viewing experience. A typical LCD panel has crystalline material suspended in a liquid medium between glass plates. An array of semiconductor switches in the LCD module applies electric fields to the crystalline material to align the crystalline material to either block light or permit light to pass through the display. The crystalline material thus acts as a shutter to control the light passing through the LCD. Because LCD displays produce no light of their own, a light source positioned to illuminate the LCD panel provides back lighting by shining light through the display.

Referring to FIG. 1, one type of traditional LCD backlight assembly 10 has a cold-cathode fluorescent tube lamp (CCFTs) 12 placed along one side of a LCD panel 14. A light diffuser plate 15 is positioned behind LCD panel 14 and tapers in thickness from a first end 16 near CCFT 12 to a second end 18. A back surface of diffuser plate 14 has a reflective coating 20. Light 22 incident to reflective coating 20 reflects into a polarizing film 24. Internal refraction causes light 22 to be reflected and eventually transmitted towards LCD panel 14 in a predetermined direction 26, thereby transmitting polarizing light emitted from CCFT 12 through LCD panel 14. Light diffuser plate 14 and polarizing film 24 evenly spread the light across the display. CCFT technology has been used extensively for many years. Compared to white LEDs, most CCFTs have a more even white spectral output that provides a more complete color gamut for the display than LED backlighting. Compared to RGB LEDs, CCFTs are deficient in red light wavelengths. However, CCFTs are considered less energy efficient than LEDs and require an inverter to transform the low voltage used for the LCD (usually 5 or 12 v) to a high voltage needed to light a CCFT. The thickness of the inverter transformer often determines the minimum thickness of the LCD display.

In the interest of energy efficiency and in minimizing overall display thickness, another method of backlighting uses a row of white LEDs placed along edges of the display to illuminate the LCD display. Similar to CCFT technology, a diffuser evenly spreads the light across the display. LED backlighting of this type has been widely used in desktop computer monitors.

In yet another type of backlighting, an array of white or RGB LEDs placed behind a diffuser positioned in back of the LCD panel illuminates the LCD display from behind. LCD displays with this backlight technology usually have the ability to dim the LEDs in the dark areas of the image being displayed, effectively increasing the contrast ratio of the display. This type of LED array backlighting has been widely used in LCD televisions.

With array-based LCD displays, open areas exist between each liquid crystal (or "pixel") making up the array. Light from white LED or CCFT backlighting bleeds or leaks around each LCD pixel, causing a blooming effect due to unnecessary illumination around the fringes of LCD pixels. This blooming effect is sometimes referred to as "inter-pixel light leakage."

SUMMARY OF THE INVENTION

In some applications, such as when LCD displays are used with night vision instrumentation, when the human eye has adapted to light levels of night vision equipment, or when detecting an infrared signature, it is necessary or desirable to turn off, significantly attenuate, or selectively tune broad-spectrum back light. As one example, it may be desirable to attenuate backlighting to an intensity level below what is achievable with CCFTs since CCFT turn off completely below a threshold energy level. As another example, it may be desirable to tune backlighting to a specified wavelength or band(s) of wavelengths that does not interfere with other light-sensitive equipment. When only white LEDs are used for backlighting, tuning the backlight to one or more specific wavelengths or bands of wavelengths is not possible because the wavelength of light emitted is determined by the material of the LED. The actual LED color of a white LED begins from a high-intensity blue LED at its base. To this base is added white phosphor similar to that used in fluorescent lights. The blue LED excites the phosphor, causing it to emit yellow light. The combination of the blue and the yellow light produces "white" light. The ratio of yellow to blue, and different phosphors determines the "temperature" or "warmth" of the light, usually measured in degrees Kelvin (2700K or 4300K, etc.) Because the white light is made up of just two colors, this means that some spectrums of color are not well represented in the output spectrum of the white LED light. The result is that these poorly represented colors look dull compared to other sources of light.

LCD panel backlighting has not addressed the unique demands of specialty viewing, such as LCD displays used in night vision instrumentation equipment, LCD displays configured for human eyes adapted to night vision equipment, and limitations inherent with detection of an infrared signature.

A limitation of RGB LED backlighting is that these prior art designs are bulky. Further, to produce the amount of light desired for daylight viewing, they must be high powered, therefore producing a lot of heat. This excessive heat has to be removed to prevent damage to the display or its components.

Therefore, an apparatus and method of LCD backlighting is needed that allows specific back lighting spectra as desired in addition to the ability to select the desired intensity levels, particularly when those levels are below what is attainable with CCFTs.

Accordingly, it is an object of the present invention to provide LCD backlighting with the ability to control the color spectrum and intensity of backlight emitted into a light distribution panel.

It is another object of the present invention to meet demands of specialty viewing using LCD displays.

The present invention achieves these and other objectives by providing an LED backlight assembly that can be used to augment or replace traditional CCFT backlighting. RGB&W (Red, Green, Blue, and White), and RGBY&W (Red, Green, Blue, Yellow, and White) backlighting provide benefits that CCFT technology does not address, such as the ability to control the spectrum of the backlight emitted through LCD pixels for specialty viewing requirements. Night Vision Instrumentation Equipment (NVIE) compatibility allows the operator of a LCD screen to continue to use a LCD screen with night vision equipment without compromising the operation of the equipment from a blooming effect caused by incompatible LCD backlight emissions. Human Eye Night Vision Adaptability allows the operator of a LCD screen to maintain the night vision adaptation of his eyes when using an LCD screen in darkened conditions.

Spectral control over LCD backlight eliminates the effect of white light bleed-through from LCD screens that utilize non-spectrally-controlled backlight, such as CCFTs or white LEDs. This white light bleed through takes place between the pixels (inter-pixel light leakage) of a LCD screen and cannot be eliminated by the use of the color palette of the pixel array of a LCD screen.

In one embodiment of the present invention, a display backlight assembly includes a light guide panel having a first principal face, a second principal face, and at least one edge surface between the first principal face and the second principal face. A display screen is aligned with and substantially perpendicular to the first principal face of the light guide panel. The assembly also includes a light source with one or more white LEDs and one or more first color LEDs, where each first color LED emits a first color of light that is red, green, blue, or yellow. Each white LED and each first color LED is positioned to direct light into the light guide panel. A controller is electrically coupled to the light source and capable of independently setting an intensity value for each white LED and for each first color LED.

In another embodiment of the assembly, the light source also includes at least one additional color LED that emits an additional color of light that is red, green, blue, or yellow, where each additional color of light is different from the first color of light and other additional colors of light. In another embodiment, the display assembly includes two, three, or four colors of LEDs in addition to the white LED(s). In one embodiment, the assembly includes one more each of a white LED, a red LED, a green LED, a blue LED, and a yellow LED.

In one embodiment of the assembly, the display backlight assembly has an average light intensity value of at least 400 nits as measured at the display screen. In another embodiment, the average light intensity value is at least 1000 nits. In yet another embodiment, the average light intensity value is at least 1100 nits.

In another embodiment of the assembly, each white LED and each color LED is positioned to emit light into the edge surface of the light guide panel. In another embodiment, each of white LED and each color LED is positioned to direct light into the second principal face of light guide panel. In another embodiment, one or more of the LEDs is positioned to direct light into the second principal face of the light guide panel and one or more of the LEDs is positioned to direct light into the edge surface of the light guide panel.

In another embodiment of the assembly, the controller is a dual-range driver having a lower-power range and a higher-power range. The lower-power range is adjustable according to a linear scale and the higher-power range is adjustable according to a logarithmic scale. In another embodiment, the controller is adjustable according to a linear scale with 65,536 steps across its full range of power.

In another embodiment of the assembly, the display screen is an LCD display. In another embodiment of the assembly, the display includes a touch screen panel or is a display screen where the assembly also includes a touch screen panel aligned with the display screen. In another embodiment of the assembly, the intensity level of the backlighting is compatible with night-vision imaging system (NVIS).

Another aspect of the present invention relates to a method of controlling backlighting for a display screen. One embodiment of the method includes providing a display screen having a controller and a light source comprising a red LED, a green LED, a blue LED, and a white LED, where each LED is disposed to emit light into a light distribution panel for backlighting the display screen. A controller receives or is capable of receiving an user-selected dimmer setting and/or a backlight color selection. The method also includes the step of determining a respective intensity value of each LED of the light source based on the backlight color selection and an illuminating one or more of the LEDs of the light source to the respective intensity value using the controller.

In another embodiment, the method includes the step of providing a display screen includes selecting a light source that includes one or more yellow LEDs. In another embodiment, the step of providing a display screen includes selecting a light source including a cold-cathode fluorescent tube (CCFT).

In another embodiment, the method also includes the steps of determining whether to illuminate the CCFT based on the user-selected dimmer setting and illuminating the CCFT if the user-selected dimmer setting is above a predetermined threshold value.

In another embodiment of the method, the step of providing a display screen includes selecting the controller having a lower-power section with power output adjustable according to a linear scale and a higher-power with power output adjustable according to a logarithmic scale.

BRIEF DESCRIPTION OF THE DRAWINGS

FIG. 3 illustrates a plan view of a light mixing tube of the present invention.

FIG. 4 illustrates a front elevation of the light mixing tube of FIG. 3.

FIG. 5 illustrates an end view of the light mixing tube of FIG. 3 and shows reflective surfaces.

DETAILED DESCRIPTION OF THE PREFERRED EMBODIMENT

Figure 1:
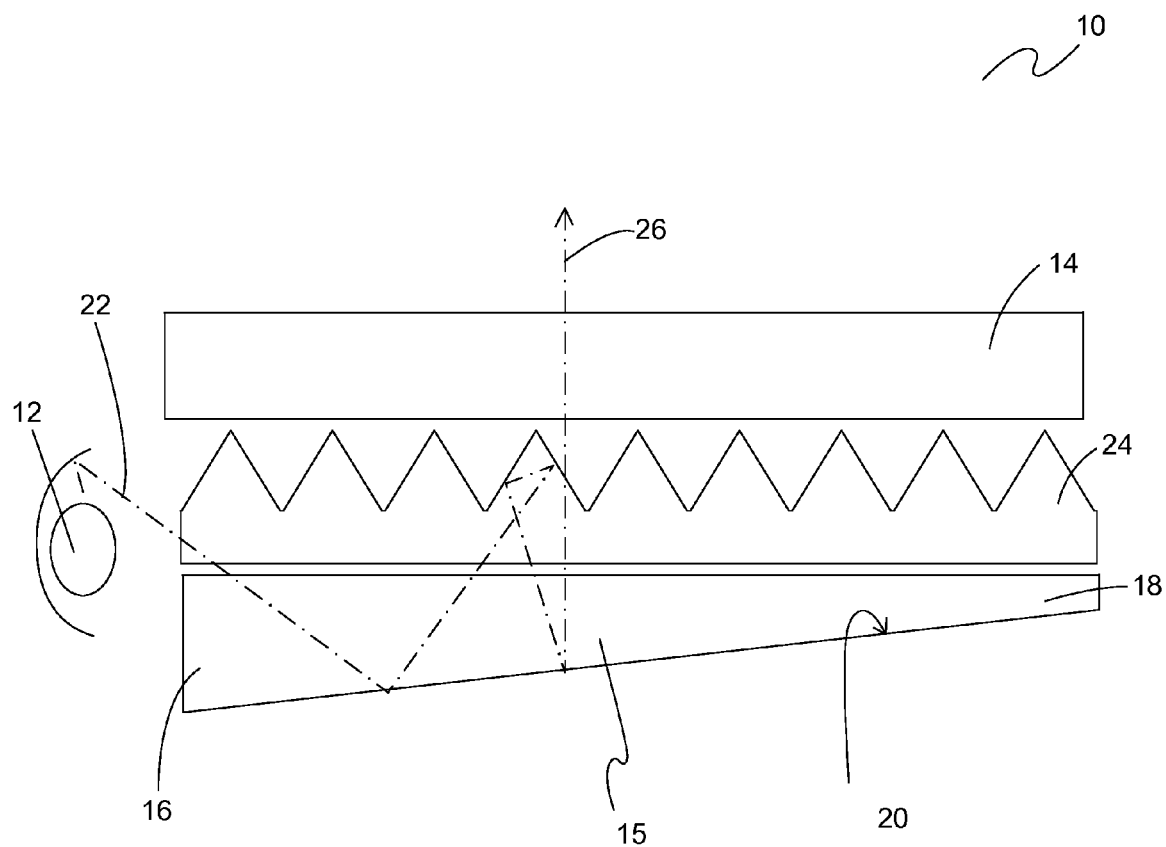
FIG. 1 illustrates one embodiment of LCD panel backlighting of the prior art.
Figure 2:
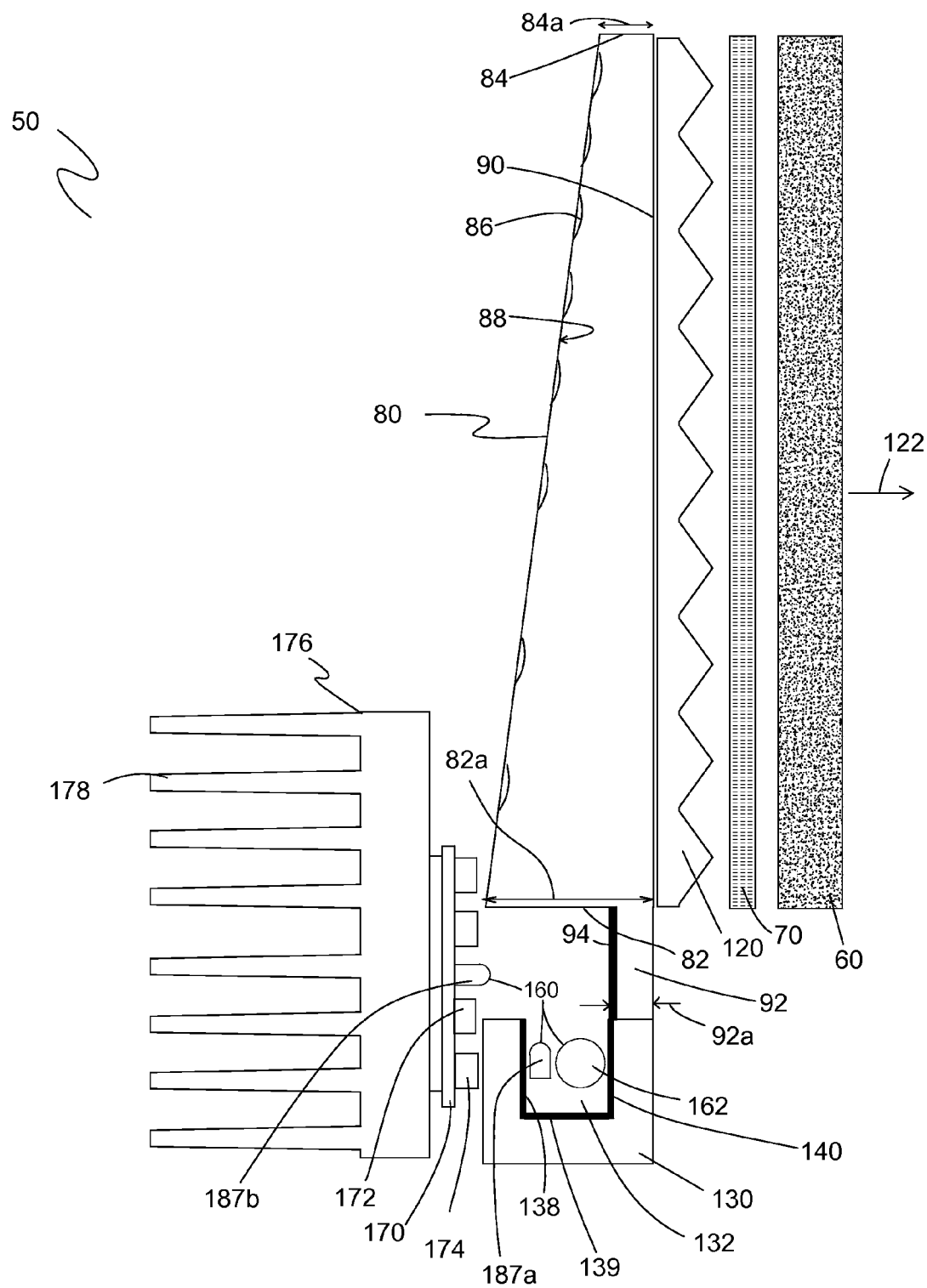
FIG. 2 illustrates a side view of one embodiment of a LCD backlight assembly of the present invention showing components of the LCD backlight assembly as arranged relative to a LCD display panel.

The preferred embodiments of the present invention are illustrated in FIGS. 2-9. FIG. 2 illustrates a side view of components in one embodiment of a backlight assembly 50 of the present invention for use with an LCD display panel 60. Backlight assembly 50 includes a light guide panel 80, a reflective polarizing film 120, a light mixing bar 130, a light source 160, and a controller 400 (not shown) electrically coupled to a LED board 170. Light source 160 is disposed adjacent a first end 82 of a light guide panel 80. An optional EMI screen 70 is situated between LCD display panel 60 and light guide panel 80.

In one embodiment, light source 160 includes a cold cathode fluorescent tube (CCFT) 162 that extends along a major portion of first end 82 of light guide panel 80 or LCD display panel 60. In other embodiments, light source 160 includes a plurality of LEDs disposed along first end 82 of light guide panel 80. In one embodiment, light source 160 includes red, green, and blue LEDs. In other embodiments, light source 160 includes red, green, and blue LEDs in addition to white LEDs. In yet other embodiments, light source 160 also includes include yellow LEDs. In still other embodiments, light source 160 includes LEDs only, but no CCFT. LEDs of light source 160 are preferably arranged in an array.

In still other embodiments, light source 160 includes a white LED in addition to an LED that emits a specially selected spectrum of light. The specially selected spectrum has a specific wavelength output. Such an embodiment is useful for displays having single purpose specialty viewing requirements. This embodiment does not provide the ability to select a light spectrum by utilizing the driver to drive individual RGB LEDs to needed intensities. However, this embodiment does greatly simplify the drive and construction demands of a backlight assembly for specific applications that require only daylight viewing (normal viewing) and specialty viewing backlighting. The specialty viewing backlighting demands only one spectrum of light and is satisfied by providing a white LED in addition to an LED of a selected light spectrum.

The color of light emitted by LEDs is generally determined by the peak wavelength. Table 1 below shows the peak wavelength, color name, viewing angle, and the LED material of commercially available LEDs. The viewing angle refers to the angle between a light beam emitted from the LED and a central axis through the LED.

TABLE 1

| Wavelength (nm) | Color Name | Viewing Angle | LED Material |
| --- | --- | --- | --- |
| 940 | Infrared | 15° | GaAlAs/GaAs—Gallium Aluminum Arsenide/Gallium Arsenide |
| 880 | Infrared | 15° | GaAlAs/GaAs—Gallium Aluminum Arsenide/Gallium Arsenide |
| 850 | Infrared | 15° | GaAlAs/GaAs—Gallium Aluminum Arsenide/Gallium Aluminum Arsenide |
| 660 | Red | 15° | GaAlAs/GaAs—Gallium Aluminum Arsenide/Gallium Aluminum Arsenide |
| 635 | High Eff. Red | 15° | GaAsP/GaP—Gallium Arsenic Phosphide/Gallium Phosphide |
| 633 | Super Red | 15° | InGaAlP—Indium Gallium Aluminum Phosphide |
| 620 | Super Orange | 15° | InGaAlP—Indium Gallium Aluminum Phosphide |
| 612 | Super Orange | 15° | InGaAlP—Indium Gallium Aluminum Phosphide |
| 605 | Orange | 15° | GaAsP/GaP—Gallium Arsenic Phosphide/Gallium Phosphide |
| 595 | Super Yellow | 15° | InGaAlP—Indium Gallium Aluminum Phosphide |
| 592 | Super Pure Yellow | 15° | InGaAlP—Indium Gallium Aluminum Phosphide |
| 585 | Yellow | 15° | GaAsP/GaP—Gallium Arsenic Phosphide/Gallium Phosphide |
| 4500K | "Incandescent" White | 20° | SiC/GaN—Silicon Carbide/Gallium Nitride |
| 6500K | Pale White | 20° | SiC/GaN—Silicon Carbide/Gallium Nitride |
| 8000K | Cool White | 20° | SiC/GaN—Silicon Carbide/Gallium Nitride |
| 574 | Super Lime Yellow | 15° | InGaAlP—Indium Gallium Aluminum Phosphide |
| 570 | Super Lime Green | 15° | InGaAlP—Indium Gallium Aluminum Phosphide |
| 565 | High Efficiency Green | 15° | GaP/GaP—Gallium Phosphide/Gallium Phosphide |
| 560 | Super Pure Green | 15° | InGaAlP—Indium Gallium Aluminum Phosphide |
| 555 | Pure Green | 15° | GaP/GaP—Gallium Phosphide/Gallium Phosphide |
| 525 | Aqua Green | 15° | SiC/GaN—Silicon Carbide/Gallium Nitride |
| 505 | Blue Green | 45° | SiC/GaN—Silicon Carbide/Gallium Nitride |
| 470 | Super Blue | 15° | SiC/GaN—Silicon Carbide/Gallium Nitride |
| 430 | Ultra Blue | 15° | SiC/GaN—Silicon Carbide/Gallium Nitride |

Thus, using Table 1 as an example, a red LED has a preferred peak wavelength of 635 nm with other acceptable values being from about 633 nm to about 660 nm; a green LED has a preferred peak wavelength of 560 nm with other acceptable values being from about 555 nm to about 565 nm; a blue LED has a preferred peak wavelength of 470 nm or 430 nm with acceptable values being from about 430 nm to about 470 nm.

The term "red LED" in one embodiment includes any LED having a peak wavelength from about 620 nm to about 700 nm, such as 700 nm (deep red), 660 nm (red), 650 nm (red), 645 nm (bright red), 630 nm ("He—Ne Laser" red), or 620 nm (orange-red). The term "green LED" in one embodiment includes any LED having a peak wavelength from about 525 nm to about 570 nm, such as 570 nm (lime green), 555 nm (blue lime green), 550 nm (emerald green), 525 nm (pure green), or 532 nm (green). The term "blue LED" in one embodiment includes any LED having a peak wavelength from about 450 nm to about 475 nm, such as 475 nm (azure blue), 473 nm (blue), 470 nm-460 nm (bright blue), or 450 nm (pure blue). The term "yellow LED" in one embodiment includes any LED having a peak wavelength from about 570 nm to about 595 nm, such as 570 nm, 585 nm, 592 nm and 595 nm.

White LEDs have a broad spectrum of light emitted by phosphors together with a short-wavelength LED. For example, when one phosphor material included in a blue LED is illuminated by the emitted blue light, the phosphor material emits yellow light having a relatively broad spectral distribution. By using the phosphor in a blue LED having a dominant peak wavelength of about 450 to 470 nanometers, some of the blue light is converted to yellow light having a lower peak from 500-600 nm. In one embodiment, the lower peak emitted by the phosphor is from 560-585 nm. The yellow light emission curve is relatively broad compared to the relatively narrow peaks of red, blue, and green LEDs. When the remaining blue light is mixed with the yellow light, the result is white light.

Preferably, backlight assembly 50 has light source 160 with CCFT 162 and an array of RGB&W or RGBY&W LEDs. Light source 160 includes one or more LEDs positioned adjacent CCFT 162 in channel 132 of light mixing bar 130 as indicated by LED 187*a*. Alternately, or in addition, all or part of light source 160 is positioned adjacent light mixing bar 130, such as when LEDs are electrically coupled to a LED board 170 as illustrated by LED 187*b*.

In one embodiment, LEDs of light source 160 are disposed on LED board 170 and are preferably arranged in an array having at least red, green, and blue light output. The array in one embodiment is a single row of LEDs; in other embodiments, the array has a plurality of rows of LEDs. When CCFT 162 is present, the array of LEDs preferably has a length that depends on the length of the CCFT(s) 162. Using both the RGB&W or RGBY&W LEDs and CCFT 162 provides improved daytime operation due to increased backlight intensity for LCD display panel 60.

Mixed light emitted from light source 160 may be directed into the end of light guide panel 80 as a replacement for or in addition to light source 160. In other embodiments, mixed light is introduced from behind LCD display panel 60 by distributing LEDs of different colors across the backside of the LCD display panel 60. In yet other embodiments, all or part of light source 160 is positioned along two or more ends of LCD display panel 60, such as along left, right, top, and/or bottom sides of a rectangular display. In such embodiments, multiple light guide panels 80 may be present, one for each portion of light source 160.

Light source 160 preferably includes both primary color LEDs (red, green, and blue) in addition to yellow and white LEDs to provide sufficient light output levels for daylight viewing as well as spectrum-controlled viewing. Spectrum-controlled viewing typically requires significantly lower LCD display luminance levels than daylight viewing. Including white LEDs ensures that adequate day viewing luminance levels are maintained.

Figure 9A:
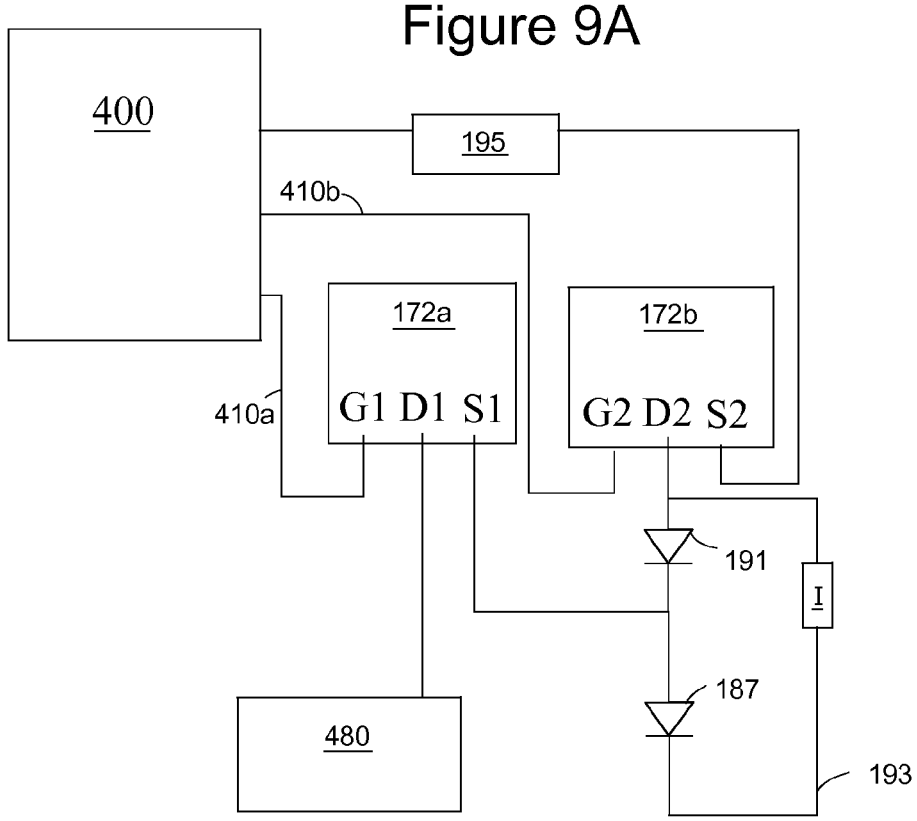
FIGS. 9A and 9B illustrate example wiring diagrams for LED(s), FET devices, a DC power supply, and a controller.
Figure 9B:
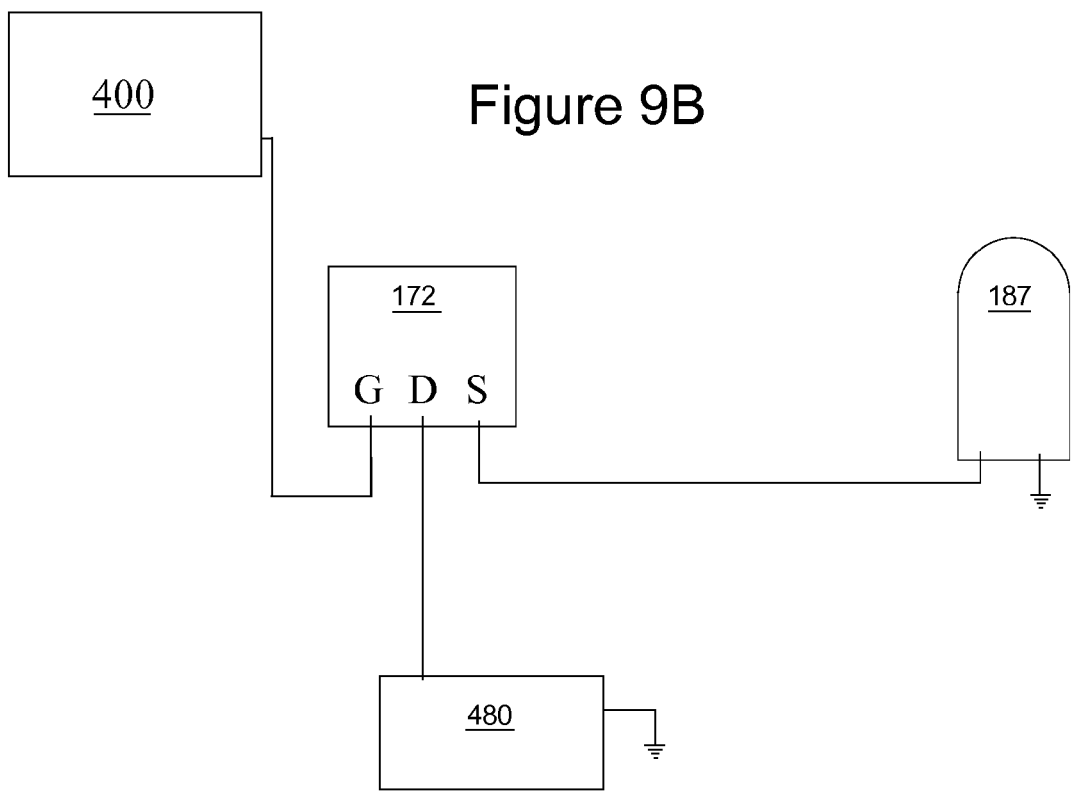

LED board 170 in one embodiment includes a plurality of FET devices or transistors 172 (e.g., FETs or MOSFETs) and/or zener diodes 174. As shown in FIGS. 9A and 9B, in one embodiment, LED board 170 includes one FET 172 per LED 187 or string of LEDs 187. In embodiments with fault monitoring as shown in FIG. 9A, two FETs 172*a*, 172*b* are present per LED 187 or LED string, where a first FET 172*a* is connected in series with a second FET 172*b*. Separate on/off signals (e.g., 410*a*, 410*b*) are communicated from controller 400 to gate G1 of first FET 172*a* and to gate G2 of second FET 172*b*. Separate signals for each FET 172 allows controller 400 turn off first FET 172*a* and break the DC power connection to second FET 172*b* independently of the controller signal to gate G2 of second FET 172*b*. DC power is received from power source 480 at drain D1 of first FET 172*a*. The source output 51 of first FET 172*a* is input to the drain D2 of second FET 172*b*. Source S2 of second FET 172*b* connects to sensing circuitry 195 and to controller 400. A power diode 191 and an inductor I are included in a loop 193 between LED 187 and second FET 172*b*. During normal operation, first FET 172*a* is almost always on, unless a fault is detected at which point it is turned off. The wiring diagram of FIG. 9A uses pulse width modulation to provide power to LED 187 with a power level corresponding to the user-selected intensity value for backlighting.

An example of an acceptable FED device 172 is IRFR210BTM 200V, 2.7 A, Fast Switching MOSFET as made by Fairchild Semiconductor. Preferably, LEDs 187 are high-output LEDs that operate with 38 VDC, 1.2 Amp drive, and provide 8,000 lumens output. When LED board 170 includes FET devices 172, a heat sink 178 on the FET device 172 is needed or the FET device 172 should be mounted to an aluminum board for heat sinking. When using high-output LEDs 187 as mentioned, the requirement for heat dissipation for the LEDs 187 makes it is advantageous to include the FET devices 172 together on LED board 170 with LEDs 187 and to use a common heat sink 178 for both the FET devices 172 and LEDs 187. For a common heat sink 178, LED board 170 preferably is an aluminum circuit board that is thermally connected to heat sink 178 rather than the typical fiberglass circuit board. This arrangement overcomes the problem of large size and high cost of having a separate high-power LED driver board with FET devices 172 and the heat sinks 178 required of high-power FET devices 172. Cost and size benefits are particularly noticeable when driving a number of high-power LED circuits each with its own FET power drive requirement.

By including high-power FET devices 172 onto LED board 170, all that is needed is a low-power control circuit from controller 400 and a separate power supply 480. This means the control circuit can be embedded into backlighting assembly 50 in a location other than on LED board 170. By doing so, one controller 400 is used to control multiple strings of LEDs 187 and controller 400 can remotely locate the power supply. Therefore, if DC power is available separately from backlighting assembly 50, the expense of a power supply is also saved.

LED board 170 in one embodiment includes circuitry necessary to receive power-level commands from controller 400. Controller 400 is supplied by a high-power DC power supply 480 and provides the DC power to drive LEDs 187. Accordingly, controller 400 and LED board 170 are configured to independently set the LED light output level of each LED 187 of light source 160. In one embodiment, a light output level or intensity of each LED of light source 160 is controlled using direct control of voltage or current. Light intensity of each LED of light source 160 can also be controlled by adjusting the value of the LED supply voltage. Other methods to control light intensity are also acceptable provided that the light output level of any one LED can be set or controlled independently of the level of any other LED. To dissipate heat, LED board 170 is preferably is attached to or contacts a heat sink 176 having a plurality of fins 178. Controller 400 preferably is distinct from LED board 170 to avoid the heat of LEDs 187. In one embodiment, controller 400 is, an external control unit capable of communicating with LED board 170.

Light guide panel 80 is a plastic sheet that tapers from a larger first end 82 with first side thickness 82a to a smaller second end 84 with second side thickness 84a. In one embodiment, first side thickness 82a is about 4 mm and second side thickness is about 1 mm. Light guide panel 80 has a reflective surface 88 opposite of a first principal face or emission surface 90, both of which extend between first end 82 and second end 84. First principal face 90 is generally aligned with and positioned substantially parallel to LCD display panel 60. Accordingly, second principal face or reflective surface 88 is generally angled with respect to first principal face 90 and LCD display panel 60. A series of diffusers 86 (e.g., protrusions or depressions) on sloped second principal face 88 diffuse light evenly across light guide panel 80. In one embodiment, the density or size of diffusers 86 increases across reflective surface 88 in a direction moving from first end 82 to second end 84. Diffused light exits light guide panel 80 through first principal face 90.

In one embodiment, light guide panel 80 has an edge portion 92 extending along first principal face 90 and having an edge thickness 92a that is smaller than first side thickness 82a. A rear surface 94 of first side edge portion 92 is a reflective surface that reflects light from light source 160 into first end 82 of light guide panel 80.

A reflective polarizing film 120 preferably abuts or is affixed to first principal face 90 of light guide panel 80. Polarizing film 120 internally reflects any non-polarized light and allows polarized light to pass through in one or more pre-defined directions 122 to illuminate LCD display panel 60.

An optional light mixing bar or channel 130 is situated adjacent first end 82 of light guide panel 80. Light mixing bar 130 mixes the colors and intensity of light emitted from each individual LED into a color that is representative of the CIE color scale and has a uniform intensity. Light source 160 is preferably positioned within or adjacent to light mixing bar 130.

Referring now to FIGS. 3-5, top, front, and end views, respectively, illustrate one embodiment of light mixing bar 130. Light mixing bar 130 is preferably a longitudinal U-shaped bar of generally rectangular overall cross-sectional shape. A channel 132 extends along light mixing bar 130 and is sized and configured to accept light source 160. Channel 132 in one embodiment has one open end 134 and one closed end 136. In other embodiments, ends 134, 136 are either both open or both closed. In one embodiment, channel 132 has reflective surfaces 138, 139, 140 to reflect light from light source 160 (shown in FIG. 2). Reflective surfaces 138, 139, 140 are preferably arranged substantially perpendicularly to one another and define a U-shape. In one embodiment, reflective surfaces 138, 139, 140 are part of walls that define channel 132; in other embodiments, reflective surfaces 138, 139, 140 are distinct from walls of channel 132.

Figure 6:
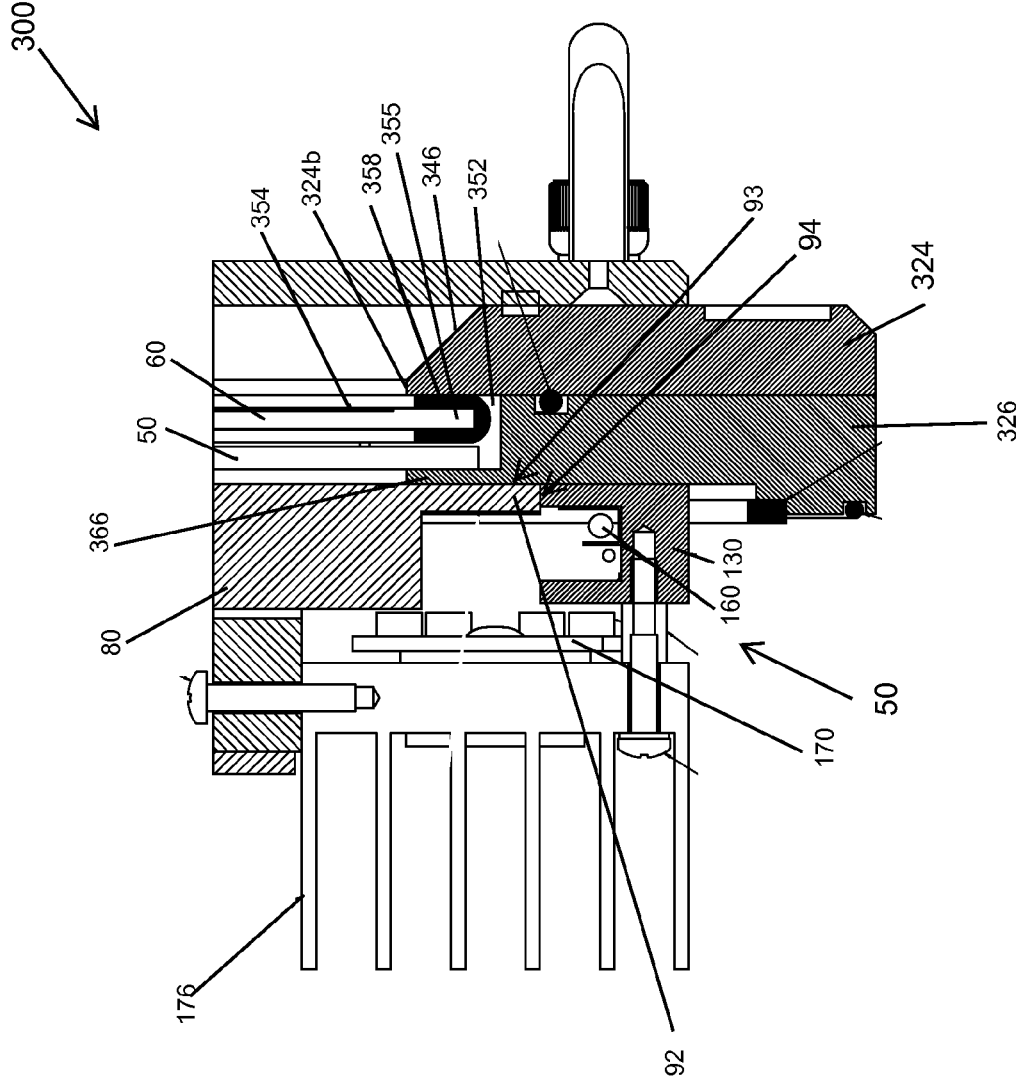
FIG. 6 illustrates a cross-sectional view of a portion of a LCD backlight assembly of the present invention assembled with an LCD display.

A plurality of optional recessed openings 142 extend transversely through a lower portion 144 of light mixing bar 130 and are useful for attaching light mixing bar 130 to other components in backlight assembly 50. Lower portion 144 is the portion of light mixing bar 130 positioned beneath channel 132 as shown in FIG. 5. Recessed openings 142 accept fasteners (not shown) for attachment to bottom bezel part 326 as shown in FIG. 6. A plurality of optional openings 146 extend transversely at least partially through lower portion 136 of light mixing bar 130. Openings 146 are useful to receive fasteners (shown in FIG. 5) for attachment of additional components, such as heat sink 176 as shown in FIG. 6.

FIG. 6 illustrates a cross-sectional view of backlight assembly 50 as installed in a LCD display assembly 300 that includes LCD display panel 60, a bottom bezel part 326, and top bezel part 324.

An inner edge 324b of top bezel part 324 extends inwardly past bottom bezel part 326 to define a pocket 352 between top bezel part 324 and bottom bezel part 326. Pocket 352 receives an edge 355 of LCD display panel 60 (e.g., a touch-screen LCD display panel). In one embodiment, edge 355 has an edge gasket 358 that extends around the perimeter of LCD display panel 60 and contacts edge 355 on three sides. Edge gasket 358 in one embodiment is a U-shaped neoprene rubber channel gasket or edge trim that extends continuously along edges of all four sides of a rectangular panel. Typically, LCD display panel 60 in one embodiment has a conductive surface 354 positioned within the bounds of edge gasket 358. Pocket 352 optionally receives an EMI panel or screen 70, such as a copper mesh laminated to polycarbonate. In one embodiment, EMI screen 70 has 0.001" copper mesh with 80 openings per inch and oriented at 45° to rectangular top bezel part 324.

In the embodiment shown in FIG. 6, EMI screen 70 directly abuts protrusion 366 of bottom bezel part 326 with its back side 366a and directly abuts edge gasket 358 with its front side 366b. Edge gasket 358 along front side 60b of LCD display panel 60 directly abuts top bezel part 324. In some embodiments, top bezel part 324 and bottom bezel part 326 define a plurality of slots or pockets 352 to accommodate various layers or components in display assembly 300. These component layers include LCD display panel 60, EMI screen 70, and light guide panel 80, for example. Pockets 352 may be defined by channels formed in, tabs (e.g., protrusion 366) extending from, or gaps between portions of one or both of top bezel part 324 and/or bottom bezel part 326. Pockets 352 may overlap from front to back (i.e., from top bezel part 324 to bottom bezel part 326) and the number of pockets 352 may be limited by the number of components and the combined thickness of the top and bottom bezel parts 324, 326.

Light guide panel 80 is situated behind bottom bezel part 326. An edge portion 92 of light guide panel 80 has a front face 93 that abuts the back side of protrusion 366 of bottom bezel part 326. In one embodiment, a bottom face 94 of edge portion 92 also directly abuts a light mixing bar 130 fastened to the back side of bottom bezel part 326 and containing light source 160. LED board 170 is fastened to heat sink 176.

As described above and shown in FIG. 6, some gaps between individual components are filled by a gasket, such as U-shaped gasket 358 on edge 346 of LCD display panel 60. In other instances, no gasket exists between components and top or bottom bezel parts 324, 326. That is, some components, such as EMI panel 60 and LCD display panel 60, are preferably held in direct contact with top or bottom bezel part 324, 326 rather than having a softer, intermediate rubber gasket or other material between the component and the bezel. A gasket or other less rigid material may be perceived as providing a dampening effect, but in actuality it tends to reflect first shock waves where they combine with secondary shock waves to produce a larger effective shock wave. The larger effective shock wave can cause damage to components of LCD display assembly 300. Eliminating a gasket in some instances therefore causes shock forces to be transmitted through component parts and results in a greater ability to successfully sustain high levels of shock without damage. Preferably, LCD display assembly 300 is configured to qualify for Military Specification MIL-S-901D, type C, shock testing for subassemblies, incorporated herein by reference in its entirety.

Figure 7:
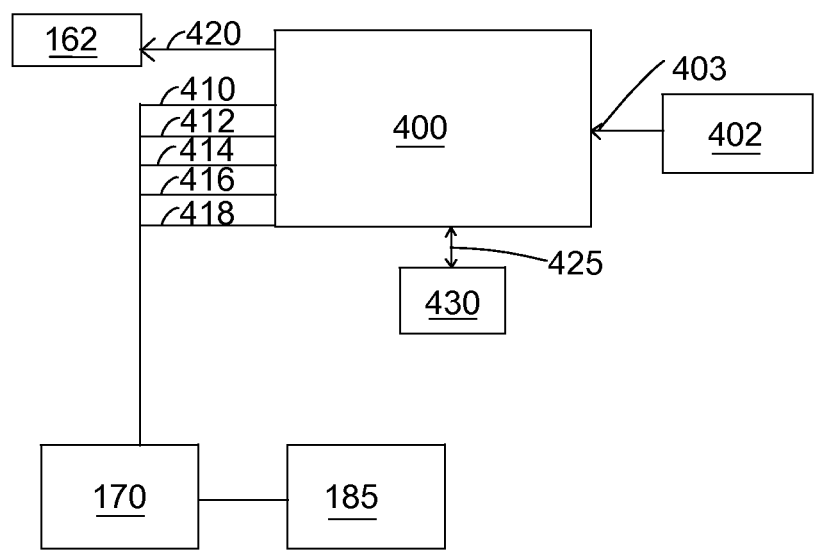
FIG. 7 illustrates a block diagram of one embodiment of a controller of the present invention.

Turning now to FIG. 7, a block diagram illustrates one embodiment of LED board 170 with light controller 400 used to control backlight illumination of LCD display panel 60. Light controller 400 preferably has four control channels 410, 412, 414, 416 when used to control red, green, blue, and white LEDs. Light controller 400 preferably has five channels 410, 412, 414, 416, 418 when used to control red, green, blue, yellow, and white LEDs. Each control channel is assigned to LEDs emitting a particular wavelength or band of light, where one channel is assigned to each color and one channel is assigned to white. When CCFT 162 is present, light controller 400 also includes a variable voltage output 420 for controlling CCFT 162 of light source 160, a digital dimmer input 403 for intensity control of CCFT 162, a LED driver board 185 that drives LEDs 187, and a serial interface 425 for communication with a computer or CPU 430.

Control software allows the operator to configure light controller 400 for at least three different operational modes. The operator can define each mode to operate as desired. For example, a typical marine configuration defines a Daylight Readability Mode where RGB&W/RGBY&W channels are configured for white light and the CCFT 162 is turned on; a Human Night Vision Conservation Mode with RGB&W/RGBY&W configured for low intensity Human Night Vision compatibility and CCFT 162 is turned off; and a NVIS Mode with RGB&W/RGBY&W configured for night vision goggle compatibility and CCFT 162 is turned off. In daytime readability mode, display panel 60 preferably has an average light intensity value of at least 400 nits, more preferably more than 600 nits. In some embodiments, display panel 60 has an average light intensity of 1000 to 1100 nits or more.

Using dimmer input 403 from a digital dimmer 402, the average light intensity value of light source 160 is adjustable from off to maximum intensity over 65,536 steps. This gives very fine control over backlight intensity. Because CCFTs are voltage-controlled devices that require a minimum turn-on voltage to operate, CCFT 162 is not able to accurately control low-level intensity settings. Thus, light controller 400 preferably includes a configurable transition setting with a value between 0 and 100%. The transition setting value determines when the CCFT is enabled or disabled. For example, the CCFT is disabled when the intensity setting is below the transition value. Typically, the transition value for CCFTs is 35% of maximum intensity. The transition setting enables the light output from LEDs of light source 160 to provide accurate intensity control at settings below the turn-on voltage of CCFT 162. In one embodiment, digital dimmer 402 is a single unit with CPU or computer 430.

Two power conservation modes are integrated into controller 400. One mode addresses power and heat management when operating at full intensity; the other mode addresses power management when operating on secondary power, such as a battery. When operating on primary power (e.g., 115 VAC), the maximum backlight intensity can be reduced (via configuration) to better manage power use and heat generation. An override intensity boost feature allows RGB&W/RGBY&W controller 400 to output full intensity for a configurable, short duration to aid the operator when interacting with the display in high-bright conditions. When operating on secondary power (e.g., battery), the backlight intensity is reduced for longer battery life.

Application software of the present invention includes a DLL file that can be linked into the application software. The DLL file provides an application programming interface that allows the application to configure and control controller 400 with the following features:

(1) configure operation mode (e.g., three different configurations);
(2) select active operation mode;
(3) on/off setting for RGB&W/RGBY&W LED control;
(4) on/off setting for CCFT;
(5) on/off setting for CCFT control;
(6) CCFT Transition value from 0 to 100 percent intensity at which CCFT turns off,
(7) Limited Maximum Intensity where the display's maximum intensity can be limited for power conservation or other reasons;
(8) Intensity Boost Configuration determines the length of time (e.g., number of minutes) RGB&W/RGBY&W controller 400 outputs at maximum intensity (not limited) when Intensity Boost has been activated;
(9) start/stop of intensity boost control;
(10) on/off setting for battery mode on/off for conserving power when powered with a battery; and
(11) Backlight Color Selection Mode—select the spectrum of the backlight color using the CEI chart color numbers or using a visual color chart to set the RGB&W/RGBY&W output light color.

Figure 8:
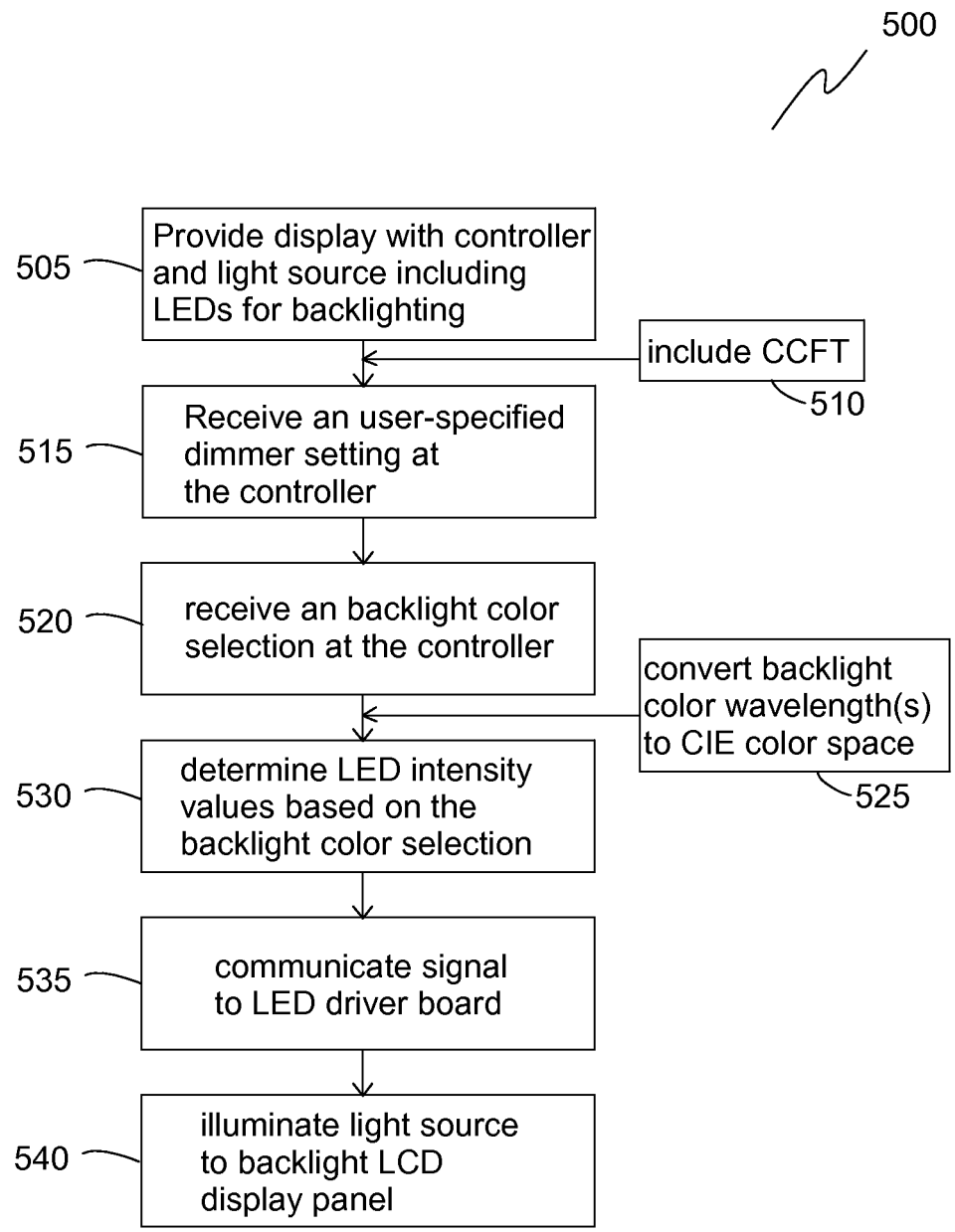
FIG. 8 is a flow chart that illustrates steps in one embodiment of a method of controlling LCD backlighting.

Turning now to FIG. 8, a flow chart illustrates steps in one embodiment of a method 500 of backlighting. In step 505, a display is provided that includes a light source with LEDs for backlighting the display and a controller for controlling the intensity of the backlighting. A DC power supply is included to supply power to drive the LEDs. In one embodiment, the light source includes one or more of each of red, green, blue, and white LEDS. In another embodiment, the light source also includes one or more yellow LEDs.

In step 510, the light source is optionally selected to include a cold-cathode fluorescent tube (CCFT). The CCFT is useful for backlighting the display in display settings having a higher light intensity.

In step 515, controller 400 receives a user-selected dimmer setting 403 from dimmer 402. The dimmer setting specifies an average light intensity value of display backlighting. Controller 400 converts the user input to an output drive signal to FETs on an LED driver board included in controller 400.

In one embodiment, controller 400 is programmed for dual sensitivity. In a lower-power sensitivity region, the dimmer setting is selected according to a linear scale, and a higher-power region the dimmer setting is selected according to a logarithmic scale. In another embodiment, controller 400 is designed as a linear controller across the entire range of light intensity requirements, with sufficient resolution to meet both the low level light output requirements and the regular day time viewing light requirements. In one such embodiment, controller 400 has 65,536 light steps for each color driven, where each color is individually and separately controlled, and so that each LED output can be set to a light step independent of any other LED output (e.g., R,G, B, Y, or W).

In step 520, a backlight color selection is optionally received at the controller. In some embodiments, backlighting is provided according to a predetermined color palette. In other embodiments, the wavelength(s) of the backlighting varies depending on the dimmer setting. In yet other embodiments, the user selects a backlight color depending on the application.

In step 525, a CPU 430 of controller 400 uses a color selection algorithm as known in the art to select one or more backlight color wavelengths or bands of wavelengths for the backlight color selection. In one embodiment, the controller converts the backlight color wavelength(s) to CIE color space (Commission Internationale del'Eclairage (1931)) using color selection algorithms known in the art. Other color selection algorithms known in the art are also acceptable. In one embodiment, the user sets or inputs the desired color spectrum from a Graphical User Interface displaying a CIE color map as is known in the art. The user alternately may input RGB color numbers from the CIE color space.

In step 530, CPU 430 included in controller 400 or separate from controller 400 determines the intensity of each LED for the backlight color selection. In one embodiment, the controller uses a CIE color realization algorithm as known in the art to calculate the intensities for each LED and for the CCFT (if included). In one embodiment, a CCFT signal is a variable voltage signal.

In step 535, the controller communicates LED intensity information to FETs located on an LED driver board that is part of controller 400 or separate from controller 400 and coupled to LED board 170. In another embodiment, FETs are located on LED board 170, where LED board 170 provides mounting and circuitry to connect power to the individual LEDs of light source 160. A DC power supply coupled to controller 400 provides the power to drive the LEDs. Controller 400 uses output drive signals 410, 412, 414, 416, 418 to command the FETs on LED board 170 on a separate LED driver board to turn on and off, thereby providing the desired LED power levels and desired color output. In one embodiment, LED board 170 includes protective circuitry that senses the return LED current value of each LED on LED board 170 to prevent reverse power from burning out LEDs.

In step 540, based on the communicated LED intensity information, controller 400 illuminates individual LEDs of the light source to provide a color schedule in accordance with color selection. In one embodiment, the LED intensities emit light in accordance with the CIE color space.

In step 545, depending on whether the value of the dimmer setting is above a predetermined threshold value, the controller optionally illuminates CCFT. For example, in low-light conditions, the CCFT will not be used because the intensity of light provided by the CCFT at the minimum turn-on voltage exceeds what is needed. In daylight reading conditions, for example, the CCFT is used in addition to the LEDs of the light source to provide backlighting sufficient for daylight readability.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

I claim:

1. A display backlight assembly comprising:
   a light guide panel having a first principal face, a second principal face, and at least one edge surface;
   a display screen aligned with and substantially perpendicular to the first principal face of the light guide panel;
   a light source comprising at least one white LED and at least one first color LED, wherein the at least one first color LED emits a first color of light selected from the group consisting of red, green, blue, and yellow and wherein the at least one white LED and the at least one first color LED are positioned to emit light into the light guide panel; and
   a controller electrically coupled to the light source, the controller capable of independently controlling an intensity value for the at least one white LED and for the at least one first color LED, wherein the controller comprises a dual-range driver providing a power output level and having a lower-power range and a higher-power range, the power output level being adjustable according to a linear scale in the lower-power range and the power output level being adjustable according to a logarithmic scale in the higher-power range.

2. The display backlight assembly of claim 1, wherein the light source further comprises at least one additional color LED that emits an additional color of light selected from the group consisting of red, green, blue, and yellow, wherein the additional color of light is different from the first color of light.

3. The display backlight assembly of claim 1, wherein the display backlight assembly has an average light intensity value of at least 400 nits.

4. The display backlight assembly of claim 3, wherein the average light intensity value is at least 1000 nits.

5. The display backlight assembly of claim 4, wherein the average light intensity value is at least 1100 nits.

6. The display backlight assembly of claim 1, wherein each of the at least one white LEDs and each of the at least one first color LEDs are positioned to emit light into the edge surface of the light guide panel.

7. The display backlight assembly of claim 1, wherein each of the at least one white LEDs and each of the at least one first color LEDs are positioned to direct light into the second principal face of light guide panel.

8. The display back light assembly of claim 1, wherein the controller is capable of setting the intensity value over about 65,000 steps.

9. The display back light assembly of claim 1, further comprising a touch screen panel aligned with the display screen.

10. A display backlight assembly comprising:
    a light guide panel having a first principal face, a second principal face, and at least one edge surface;
    a display screen aligned with and substantially perpendicular to the first principal face of the light guide panel;
    a light source comprising at least one white LED and at least one first color LED, wherein the at least one first color LED emits a first color of light selected from the group consisting of red, green, blue, and yellow and wherein the at least one white LED and the at least one first color LED are positioned to emit light into the light guide panel;
    a controller electrically coupled to the light source, the controller capable of independently controlling an intensity value for the at least one white LED and for the at least one first color LED; and
    an EMI panel aligned with the display screen and disposed between the display screen and the light guide panel.

11. The display back light assembly of claim 1, wherein the intensity value is compatible with a night-vision imaging system (NVIS).

12. The display back light assembly of claim 1, further comprising an LED board that includes the at least one white LED, the at least one first color LED, and at least one FET device providing power to the at least one white led and at least one second FET device providing power to the at least one first color LED.

13. A method of controlling backlighting for a display screen comprising:
    providing a display screen having a controller and a light source comprising at least one white LED and at least one additional LED with light emission different from light emission of the at least one white LED, wherein the light source is positioned to emit light into a light distribution panel to backlight the display screen, wherein the controller has a dual-range driver providing a power output level with a lower-power range and a higher-power range, the power output level being adjustable according to a linear scale in the lower-power range and the power output level being adjustable according to a logarithmic scale in the higher-power range;

receiving a user-selected dimmer setting at a controller;

determining a respective intensity value of the white LED and each of the at least one additional LED of the light source based on the user-selected dimmer setting; and illuminating one or more of the at least one white LED and the at least one additional LED of the light source to the respective intensity value using the controller.

14. The method of claim 13, further comprising receiving a backlight color selection at the controller.

15. The method of claim 13, wherein the step of providing a display screen includes selecting a light source wherein the at least one additional LED is selected from the group consisting of a red LED, a green LED, a blue LED, and a yellow LED.

16. The method of claim 13, wherein the step of providing a display screen includes selecting a light source including a cold-cathode fluorescent tube (CCFT).

17. The method of claim 16, further comprising:
determining whether to illuminate the CCFT based on the user-selected dimmer setting; and
illuminating the CCFT if the user-selected dimmer setting is above a predetermined threshold value.

18. The method of claim 13, further comprising receiving a user-selected operating mode, the user-selected operating mode selected from the group consisting of a daylight reading mode, a night vision conservation mode, and a power conservation mode.

* * * * *